April 12, 1932.  C. P. STEWART  1,853,094

SIGNALING APPARATUS

Filed Aug. 5, 1927

Inventor
Charles P. Stewart

By Spencer, Hardman &c Fehr
Attorney

Patented Apr. 12, 1932

1,853,094

UNITED STATES PATENT OFFICE

CHARLES P. STEWART, OF DETROIT, MICHIGAN

SIGNALING APPARATUS

Application filed August 5, 1927. Serial No. 210,829.

This invention relates to signaling apparatus for automotive vehicles and one of its objects is to provide an improved rear end signal lamp which can be used as a tail lamp and also as a stop lamp, the lamp being illuminated by a single incandescent bulb having two filaments, the one of lesser candle power being used to illuminate the rear end signal and the one of higher candle power to illuminate the stop signal.

Another object of the invention is to provide improvements in the control of the stop signal and automobile horn.

Further objects and advantages of the present invention will be apparent from the following description, reference being had to the accompanying drawings, wherein a preferred embodiment of one form of the present invention is clearly shown.

Figure 5:
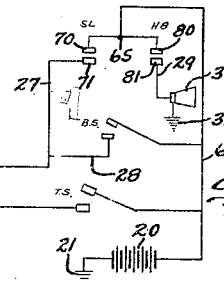
Fig. 5 is a wiring diagram of the electric circuits including the present invention.

Referring to the wiring diagram in Fig. 5, 20 designates a storage battery which is grounded at 21 and is connected with a tail lamp switch TS, a brake pedal operated stop lamp switch BS, a horn button HB and a manually operated stop lamp switch SL. A lamp bulb 22 grounded at 23 is provided with a filament 24 of lesser candle power which is connected with the tail lamp switch TS by wire 25. The lamp 22 includes a filament 26 of higher candle power connected by wire 27 with the stop light switch SL and also by wire 28 with the brake pedal operated switch BS. The horn button switch HB is connected by wire 29 with a horn 30 grounded at 31.

By closing the switch TS the tail lamp filament 24 is connected with the battery 20. Whenever the brake pedal 40 is pressed it will transmit motion to the operating lever 41 of the switch BS through a link 42 causing the brake pedal switch BS to be closed so that the stop lamp filament 26 will be connected with the battery. The horn 30 is connected with the battery by closing the horn button switch HB and the stop lamp filament 26 is connected with the battery by closing the switch SL.

Figure 1:
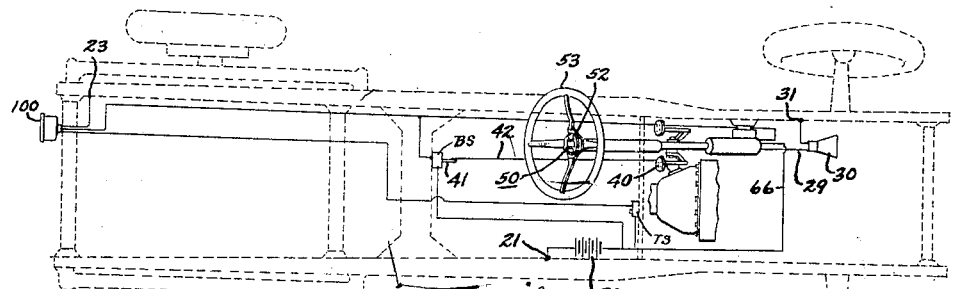
Fig. 1 is a plan view of an automobile chassis embodying the present invention, the chassis frame and wheels being shown in a phantom view in order to render more conspicuous the main features of the present invention.
Figure 2:
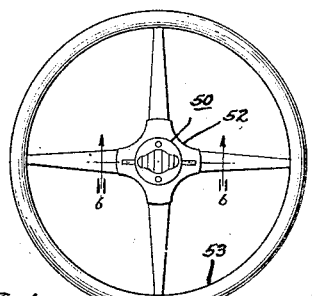
Fig. 2 is a plan view on a larger scale than Fig. 1 of the steering wheel and an electric switch supported thereby which switch is a part of the present invention.
Figure 7:
Fig. 7 is a sectional view on the line 7—7 of Fig. 6.
Figure 6:
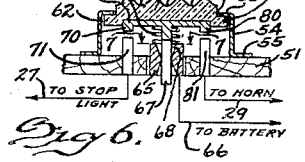
Fig. 6 is a sectional view on the line 6—6 of Fig. 2 on a larger scale than Fig. 2 showing the switch for controlling the horn and the rear end signal.
Figure 3:
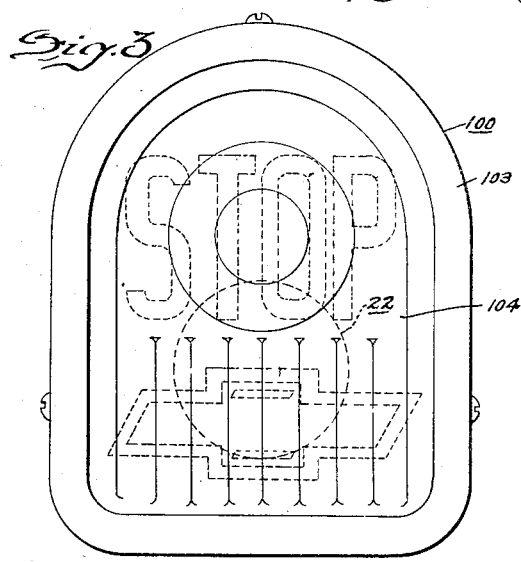
Fig. 3 is a front view of the rear end lamp included in the present invention.
Figure 4:
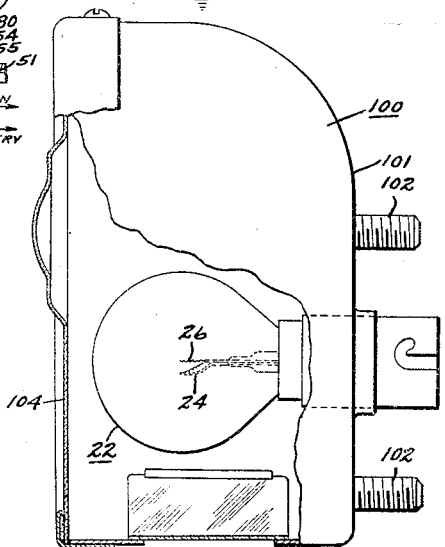
Fig. 4 is a side view, partly in section, of the lamp.

The switches SL and HB are embodied in a unitary switch structure designated as a whole by numeral 50 in Figs. 1 and 2. The switch 50 comprises a base 51 which is provided by the hub 52 of a steering wheel 53. The base 51 supports a switch case 54 having a flange 55 by which the case is attached to the base 51 and having an inwardly extending flange 56 surrounding an aperture 57 through which a switch operating button 58 is accessible. The button 58 is provided with finger recesses 59, 60 and 61, and on the inside of the case with lugs 62 and 63 which engage the flange 56 as the button 58 is pressed upwardly by spring 64 which bears against the underside of the button and a supporting block 65 insulatingly supported by the base 51 and providing a battery terminal for the switch 50 with which a wire 66 leading to the battery is connected. The button 58 which is of insulating material is attached to a rod 67 of rectangular cross section as viewed in Fig. 7. The rod 67 passes through an aperture 68 in the block 65, said aperture being so constructed and arranged as to permit the rod 67 to tip either toward the left or toward the right in its position shown in Fig. 6 but to prevent tilting of the rod 67 in a plane at right angles to the plane of the section shown in Fig. 6. This opening also permits vertical downward movement of the rod 67. Therefore, if the operator places his finger upon the finger recess 59 of the button 58, the button will tilt downwardly toward the left of Fig. 6 to cause the stop light switch contact 70 to engage the contact 71 which is connected with the wire 27. The common terminal 65 of the switch 50 is connected with the contact 70 through the rod 67 and an insert 72 which connects the rod 67 with the contact 70.

To operate the horn, the operator places his finger in the recess 61 of the button 58 and presses downwardly to cause the horn button contact 80 carried by the button 58 to engage the horn button contact 81 with which the wire 29 is connected. If it is desired to sound the horn and at the same time illuminate the stop lamp filament 26 the recess 60 is engaged by the finger and the button 58 is pressed downwardly so that the contact 70 will engage the contact 71 and contact 80 will engage the contact 81. Thus the switch terminal 65 will be connected with contacts 71 and 81 so that current from the battery will flow from the lamp filament 26 through the horn 30.

The lamp 22 is supported within a lamp housing 100, the back wall 101 of which is attached to the rear license plate holder of the automobile by studs 102 cooperating with screws not shown. The front wall of the housing 100 is closed by a door comprising a frame 103 supporting a transparent plate or wall 104 of glass, pyralin, or other transparent material. The wall 104 is preferably of red color by transmitted light in order to indicate the desired rear end signal when the filament 24 is burned. The wall 104 carries a legend Stop contrasting with the background provided by the wall according to the amount of light transmitted through the background. When the filament 26 is incandescent the plate 104 will be brightly illuminated so that the legend will be clearly visible even in the day time. It will be noted that the lamp 22 is located nearer to the bottom of the housing than to the top so that the filament 24 will be more remote from the legend. This is necessary so that the light from the filament 24 will illuminate but dimly the legend carrying portion of the wall 104 so as not to render the legend visible to a driver within safe driving distance behind the signal.

The control of the warning signals of an automobile by a switch located on the steering wheel or just above the steering column has certain advantages. The hand of the driver can be shifted very quickly from the rim of the steering wheel to the switch button to control the electric circuits of the signals. Since the hand of the driver responds more quickly to impressions of danger than the foot, the manual control of the stop signal is at times more useful than the brake pedal control. By using the switch button the stop signal can be operated without requiring the driver first to operate the brake pedal. In an emergency the first impulse is to sound the horn. The driver will soon be accustomed to push the button forcibly toward the steering column in case of danger and will thus operate the stop signal as well as the horn so as to warn the driver behind as well as pedestrians ahead.

While the form of embodiment of the present invention as herein disclosed, constitutes a preferred form, it is to be understood that other forms might be adopted, all coming within the scope of the claims which follow.

What is claimed is as follows:

1. A switch for use in an automotive signaling system comprising in combination, a base providing a pair of contacts, a supporting block carried by the base intermediate the said contacts, a case fixed to the base surrounding the contacts and providing an inwardly directed flange, a button confined within the case and having a corrugated surface presented through the said flange, a conducting insert provided on the inner surface of the button and having a non-rounded stem, said supporting block having a non-rounded aperture to receive said stem and means urging the button and insert against the flange of the case, said button being tiltable to engage either of said contacts by the said insert, or depressible to coincidentally engage both contacts.

2. A multicircuit switch comprising in combination, a base providing a pair of contacts, a supporting block with a non-rounded aperture secured to the base and providing a third circuit terminal, a spring pressed button having a conducting insert confined for disposition over said contacts and supporting block, said insert having an integral formation mating with the aperture of said supporting block to restrain rotation thereof, and the means confining said button permitting oscillation thereof for engagement between the insert and either one of the contacts, and also permitting straight line depression thereof for engagement between the insert and both of said contacts.

In testimony whereof I hereto affix my signature.

CHARLES P. STEWART.